Dec. 22, 1959　　　J. J. WALLS　　　2,918,328
DUAL TIRE WHEEL
Filed Dec. 16, 1955
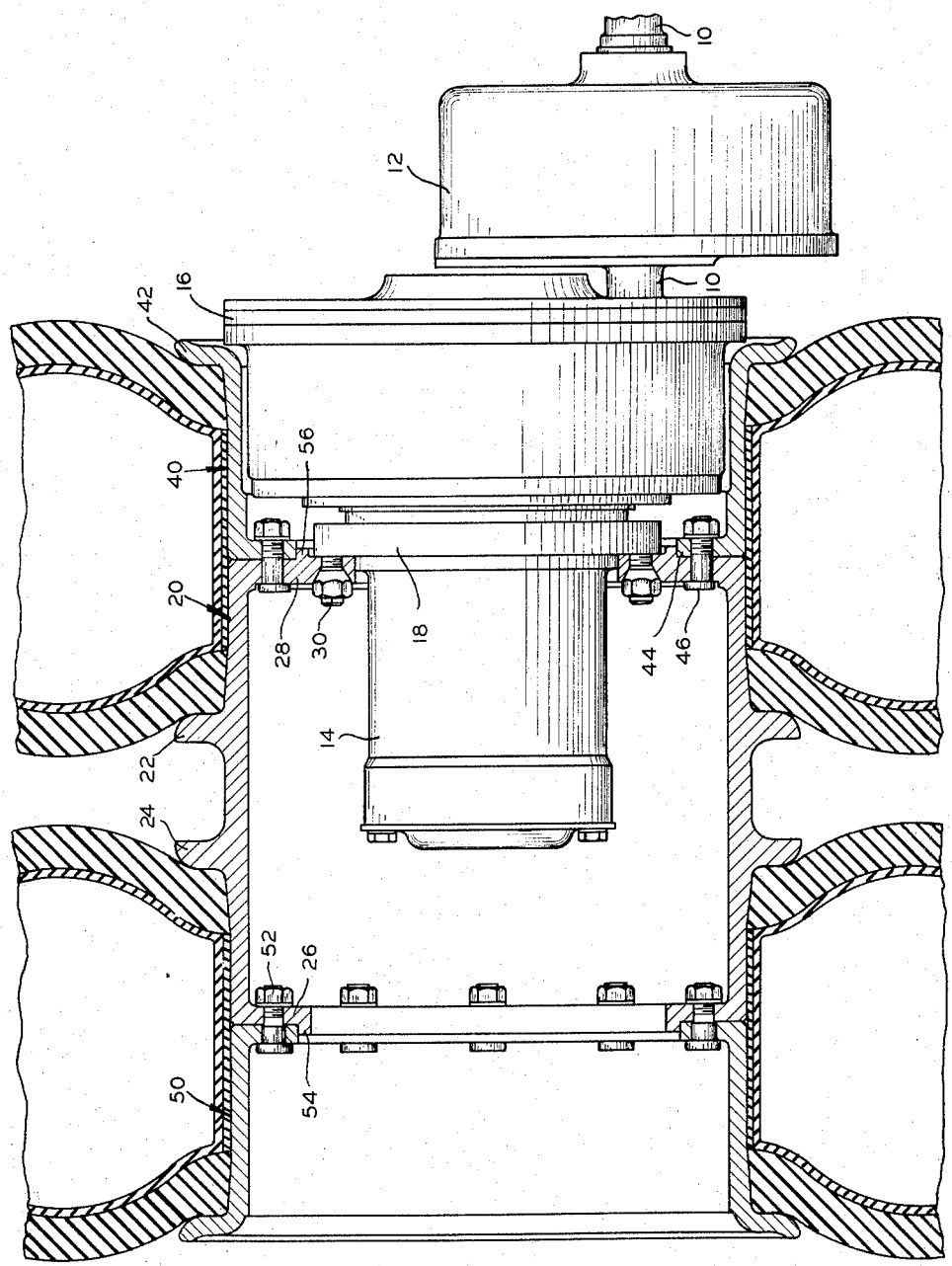
INVENTOR.
JOSEPH J. WALLS
BY J. Frederick Bechtel
ATTY.

United States Patent Office 2,918,328
Patented Dec. 22, 1959

2,918,328

DUAL TIRE WHEEL

Joseph J. Walls, Niles, Mich., assignor to Clark Equipment Company, a corporation of Michigan Application December 16, 1955, Serial No. 553,628

2 Claims. (Cl. 301—13)

This invention relates to rim and wheel structures, and more particularly to an improved dual rim and wheel structure designed to mount dual tires in parallel relation thereon.

It is an object of this invention to provide an improved and simplified wheel and rim structure.

It is a further object of this invention to provide a cantilever type wheel substantially symmetrical and having a three part rim structure.

In carrying out these objects I provide an essentially symmetrically constructed annular rim member having a pair of radially extending annular projections thereon, and a pair of substantially identical rim members mounted in oppositely disposed relation on opposite ends of the first mentioned rim member, the resulting three member wheel and rim being mounted at one end of the first mentioned rim member to a rotatable hub of a vehicle axle unit.

In the drawing, a cross sectional view of my improved rim and wheel structure is illustrated as being mounted on a rotatable hub of a vehicle axle unit.

Referring now to the drawing, a driven shaft 10, on which is mounted a brake unit 12, drives a wheel hub 14, which is mounted on a dead axle, not shown, through a gear set, not shown, mounted in a non-rotatable housing 16. An annular flange 18 is formed on the one end of rotatable hub 14.

A substantially symmetrically constructed intermediate rim member 20 has a pair of radially outwardly extending tire receiving flanges 22 and 24 formed thereon in symmetrically arranged relation to the vertical axis of rim member 20, a radially inwardly extending annular flange member 26 formed on the outboard side thereof, and a radially inwardly extending annular flange 28 formed on the inboard side thereof, and is adapted to be rigidly connected to the hub flange 18 by a plurality of circumferentially spaced bolts 30 which extend through registrable openings in the flanges 18 and 28.

A rim member 40 having a radially outwardly extending tire receiving flange 42 formed thereon at one end thereof and a radially inwardly extending annular mounting flange 44 formed on the opposite end thereof, is connected to flange 28 of rim member 20 by a plurality of circumferentially spaced bolts 46 which lock rim members 20 and 40 together for rotation with hub 14.

A third rim member 50 is identical in form to rim member 40 and is rigidly mounted in oppositely disposed relation thereto on the inwardly extending flange 26 of rim member 20 by a plurality of circumferentially spaced bolts 52.

Annular projecting bosses 54 and 56 project in opposite directions from the inner periphery of flange 26 and from an intermediate periphery of flange 28, respectively, and are in contact with the inner peripheral surfaces of the inwardly extending flanges of members 50 and 40, respectively, thereby minimizing shearing stresses on the bolts 52 and 46, respectively.

From the above it will be apparent that my improved wheel and rim structure, consisting of only three members which form a substantially symmetrical configuration about both main axes of the assembled wheel, is mounted in cantilever fashion on a revolvably driven hub in a plane which separates an end rim member from the intermediate rim member. This arrangement facilitates accessibility to the wheel mounting bolts. By providing a dual tire mounting rim structure which is readily disassembled as a single unit from the hub 18 by removing the ring of bolts 30, removal of the wheel from the hub is simplified. It is to be further noted that dual tires mounted on my rim structure are easily removable for servicing by removing the rings of bolts 46 and 52, and then breaking away the rim members 40 and 50 from the tires. It will also be seen that my wheel and rim structure provides for an interchangeability of parts in a manner not heretofore known; i.e., the rim members 40 and 50 may be interchangeably mounted on either end of wheel member 20, or such rim members may be readily mounted on either end of any other rim member such as 20.

Although the above description sets forth in detail the preferred construction of the device, I intend to cover by the appended claims such deviations from such detail may be resorted to in practice which do not form a departure from the spirit of the invention, as defined in the appended claims.

I claim:

1. A dual tire rim and wheel structure for motor vehicles comprising, an intermediate cylindrical rim member having two radially outwardly extending and symmetrically arranged tire retaining flanges formed thereon intermediate the ends thereof, the said intermediate cylindrical member having radially inwardly extending connecting flanges formed at opposite ends thereof, provisions for connecting one of the said connecting flanges to a revolvable hub, an outer cylindrical rim member having a radially outwardly extending tire retaining flange at the outer end thereof and a radially inwardly extending connecting flange at the inner end thereof, means for detachably connecting the said inwardly extending connecting flange of the said outer cylindrical rim member and the inwardly extending connecting flange at the outer end of the said intermediate cylindrical rim member for securing the outer and intermediate rim members together, an inner cylindrical rim member having a radially outwardly extending tire retaining flange at the inner end thereof and a radially inwardly extending connecting flange at the outer end thereof, and additional means for connecting the inwardly extending connecting flange of the said inner rim member to the inwardly extending connecting flange at the inner end of the said intermediate rim member for securing the intermediate and inner rim members together, whereby there is provided a unitary rim and wheel structure which may be readily demounted from a vehicle and disassembled for removing tires therefrom.

2. In a demountable wheel for motor vehicles, an intermediate cylindrical rim member having radially inwardly extending flanges formed at opposite ends thereof, one of said end flanges provided with means for connecting it to a revolvable hub, first and second interchangeable outer rim members mounted at opposite ends of the said intermediate rim member on the inwardly extending flanges thereof, wherein said intermediate rim member and said first and second outer rim members jointly comprise a wheel structure, and a plurality of radially outwardly extending flanges formed on said wheel structure for mounting dual tires thereon, said wheel structure and the outwardly extending flanges thereon forming a structure which is substantially symmetrical about a transverse vertical axis thereof.

References Cited in the file of this patent

UNITED STATES PATENTS

| | | |
|---|---|---|
| 1,662,208 | Pounds | Mar. 13, 1928 |
| 1,685,498 | McCullough | Sept. 25, 1928 |
| 2,642,316 | Frandi | June 16, 1953 |
| 2,751,959 | Blomquist | June 26, 1956 |
| 2,779,631 | Powers | Jan. 29, 1957 |

FOREIGN PATENTS

| | | |
|---|---|---|
| 92,510 | Austria | Mar. 11, 1923 |